(12) United States Patent
Aggarwal et al.

(10) Patent No.: US 9,125,153 B2
(45) Date of Patent: Sep. 1, 2015

(54) METHOD AND APPARATUS FOR TWO-WAY RANGING

(75) Inventors: Alok Aggarwal, Foster City, CA (US); Vinay Sridhara, Santa Clara, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 12/533,462

(22) Filed: Jul. 31, 2009

(65) Prior Publication Data

US 2010/0128617 A1    May 27, 2010

Related U.S. Application Data

(60) Provisional application No. 61/117,859, filed on Nov. 25, 2008.

(51) Int. Cl.
*H04L 12/26* (2006.01)
*H04W 56/00* (2009.01)

(52) U.S. Cl.
CPC .................................. *H04W 56/009* (2013.01)

(58) Field of Classification Search
CPC . H04W 84/18; H04W 52/0216; H04W 64/00; H04W 72/04; H04L 12/26
USPC .................. 370/252, 445; 375/130, 147, 141; 455/517, 506, 65, 456, 457; 342/387, 342/463, 465, 458, 450
See application file for complete search history.

(56) References Cited

U.S. PATENT DOCUMENTS

| | | | |
|---|---|---|---|
| 6,181,253 B1 | 1/2001 | Eschenbach et al. | |
| 6,477,380 B1 | 11/2002 | Uehara et al. | |
| 6,681,099 B1 | 1/2004 | Keranen et al. | |
| 6,754,488 B1 | 6/2004 | Won et al. | |
| 7,079,851 B2 | 7/2006 | Makuta | |
| 7,130,646 B2 | 10/2006 | Wang | |
| 7,138,946 B2 * | 11/2006 | Tamaki et al. | 342/463 |
| 7,233,800 B2 | 6/2007 | Laroia et al. | |
| 7,319,878 B2 | 1/2008 | Sheynblat et al. | |

(Continued)

FOREIGN PATENT DOCUMENTS

| | | |
|---|---|---|
| CN | 1269947 A | 10/2000 |
| CN | 1444833 A | 9/2003 |

(Continued)

OTHER PUBLICATIONS

International Search Report—PCT/US2009/065129, International Search Authority—European Patent Office—Mar. 31, 2010.

(Continued)

*Primary Examiner* — Jamal Javaid
(74) *Attorney, Agent, or Firm* — Jimmy Cheng; Thomas A. Jolly

(57) ABSTRACT

The subject matter disclosed herein relates to a system and method for wirelessly receiving a first communication from a first mobile device. A processing delay may be measured. An acknowledgement communication indicating receipt of the first communication may be generated. A measurement of the processing delay may be broadcast in a broadcast packet, for example, or by transmitting a subsequent communication including the processing delay in response to receiving a second communication having a request for the measurement of the processing delay.

33 Claims, 5 Drawing Sheets

(56) References Cited

U.S. PATENT DOCUMENTS

| | | |
|---|---|---|
| 7,346,120 B2 | 3/2008 | McCorkle |
| 7,373,156 B2 | 5/2008 | Ruutu et al. |
| 7,383,049 B2 | 6/2008 | Deloach, Jr. et al. |
| 7,469,139 B2 | 12/2008 | Van De Groenendaal |
| 7,525,484 B2 | 4/2009 | Dupray et al. |
| 7,574,216 B2 | 8/2009 | Leitch et al. |
| 7,672,283 B1 | 3/2010 | Chang et al. |
| 7,676,218 B2 | 3/2010 | Ballai |
| 7,716,740 B2 | 5/2010 | Robert et al. |
| 7,751,829 B2 | 7/2010 | Masuoka et al. |
| 7,756,615 B2 | 7/2010 | Barfoot et al. |
| 7,810,154 B2 | 10/2010 | Hum et al. |
| 7,861,123 B1 | 12/2010 | Tamilarasan et al. |
| 7,893,873 B2 | 2/2011 | Black et al. |
| 7,899,006 B2 | 3/2011 | Boyd |
| 7,941,159 B2 | 5/2011 | Walley et al. |
| 7,983,622 B1 | 7/2011 | Vaughan |
| 8,032,153 B2 | 10/2011 | Karr et al. |
| 8,045,996 B2 | 10/2011 | Brunner et al. |
| 8,161,316 B1 | 4/2012 | Manning et al. |
| 8,165,150 B2 | 4/2012 | Aweya et al. |
| 8,238,942 B2 | 8/2012 | Gast et al. |
| 8,244,272 B2 | 8/2012 | Morgan et al. |
| 8,265,652 B2 | 9/2012 | Piersol et al. |
| 2001/0053699 A1 | 12/2001 | McCrady et al. |
| 2002/0118723 A1* | 8/2002 | McCrady et al. ............. 375/130 |
| 2002/0173295 A1 | 11/2002 | Nykanen et al. |
| 2003/0125046 A1 | 7/2003 | Riley et al. |
| 2003/0129995 A1 | 7/2003 | Niwa |
| 2003/0182053 A1 | 9/2003 | Swope et al. |
| 2004/0003285 A1 | 1/2004 | Whelan et al. |
| 2004/0023640 A1 | 2/2004 | Ballai |
| 2004/0104842 A1 | 6/2004 | Drury et al. |
| 2004/0189712 A1 | 9/2004 | Rundell |
| 2004/0203539 A1 | 10/2004 | Benes et al. |
| 2004/0203931 A1* | 10/2004 | Karaoguz ..................... 455/457 |
| 2004/0223599 A1 | 11/2004 | Bear et al. |
| 2004/0235499 A1 | 11/2004 | Tanaka et al. |
| 2004/0258012 A1* | 12/2004 | Ishii .............................. 370/328 |
| 2004/0266457 A1 | 12/2004 | Dupray |
| 2005/0055412 A1 | 3/2005 | Kaminsky et al. |
| 2005/0058081 A1 | 3/2005 | Elliott |
| 2005/0130669 A1 | 6/2005 | Mizugaki et al. |
| 2005/0130699 A1 | 6/2005 | Kim et al. |
| 2005/0201533 A1 | 9/2005 | Emam et al. |
| 2005/0208900 A1 | 9/2005 | Karacaoglu |
| 2006/0004911 A1 | 1/2006 | Becker et al. |
| 2006/0012476 A1 | 1/2006 | Markhovsky et al. |
| 2006/0085581 A1 | 4/2006 | Martin |
| 2006/0090169 A1 | 4/2006 | Daniels et al. |
| 2006/0120334 A1 | 6/2006 | Wang et al. |
| 2006/0187028 A1 | 8/2006 | Kiang et al. |
| 2006/0189329 A1 | 8/2006 | Anderson et al. |
| 2006/0195252 A1 | 8/2006 | Orr et al. |
| 2006/0200862 A1 | 9/2006 | Olson et al. |
| 2006/0256838 A1 | 11/2006 | Yarkosky |
| 2007/0002813 A1 | 1/2007 | Tenny et al. |
| 2007/0063896 A1 | 3/2007 | Alban et al. |
| 2007/0078905 A1 | 4/2007 | Gunther et al. |
| 2007/0099646 A1 | 5/2007 | Tanaka et al. |
| 2007/0115842 A1* | 5/2007 | Matsuda et al. ............. 370/252 |
| 2007/0121560 A1 | 5/2007 | Edge |
| 2007/0135134 A1 | 6/2007 | Patrick |
| 2007/0136686 A1 | 6/2007 | Price et al. |
| 2007/0200759 A1 | 8/2007 | Heidari-Bateni et al. |
| 2007/0265020 A1 | 11/2007 | Cuffaro |
| 2007/0270168 A1 | 11/2007 | Sheynblat |
| 2007/0285306 A1 | 12/2007 | Julian et al. |
| 2008/0002820 A1 | 1/2008 | Shtiegman et al. |
| 2008/0034435 A1 | 2/2008 | Grabarnik et al. |
| 2008/0068257 A1 | 3/2008 | Mizuochi |
| 2008/0069318 A1 | 3/2008 | McClung |
| 2008/0085699 A1 | 4/2008 | Hirano et al. |
| 2008/0097966 A1 | 4/2008 | Choi et al. |
| 2008/0101227 A1 | 5/2008 | Fujita et al. |
| 2008/0101277 A1 | 5/2008 | Taylor et al. |
| 2008/0180315 A1 | 7/2008 | Tarlow et al. |
| 2008/0198811 A1 | 8/2008 | Deshpande et al. |
| 2008/0232297 A1 | 9/2008 | Mizugaki et al. |
| 2008/0250498 A1 | 10/2008 | Butti et al. |
| 2008/0287056 A1 | 11/2008 | Van De Groenendaal |
| 2008/0287139 A1 | 11/2008 | Carlson et al. |
| 2008/0291883 A1 | 11/2008 | Seok |
| 2008/0299993 A1 | 12/2008 | Gordon et al. |
| 2008/0301262 A1 | 12/2008 | Kinoshita et al. |
| 2009/0011713 A1 | 1/2009 | Abusubaih et al. |
| 2009/0059797 A1* | 3/2009 | Northcutt et al. ............. 370/238 |
| 2009/0135797 A1* | 5/2009 | Zhang et al. .................. 370/338 |
| 2009/0257426 A1 | 10/2009 | Hart et al. |
| 2009/0286549 A1 | 11/2009 | Canon et al. |
| 2010/0020776 A1 | 1/2010 | Youssef et al. |
| 2010/0067393 A1 | 3/2010 | Sakimura et al. |
| 2010/0081451 A1 | 4/2010 | Mueck et al. |
| 2010/0128637 A1 | 5/2010 | Aggarwal et al. |
| 2010/0130229 A1 | 5/2010 | Sridhara et al. |
| 2010/0130230 A1 | 5/2010 | Aggarwal et al. |
| 2010/0134348 A1 | 6/2010 | Mizuochi |
| 2010/0135178 A1 | 6/2010 | Aggarwal et al. |
| 2010/0141515 A1 | 6/2010 | Doucet et al. |
| 2010/0157848 A1 | 6/2010 | Das et al. |
| 2010/0159958 A1 | 6/2010 | Naguib et al. |
| 2010/0172259 A1 | 7/2010 | Aggarwal et al. |
| 2011/0092226 A1 | 4/2011 | Maher et al. |
| 2011/0110293 A1 | 5/2011 | Hart et al. |
| 2011/0173674 A1 | 7/2011 | Thomson et al. |
| 2011/0217987 A1 | 9/2011 | Van De Groenendaal |
| 2011/0269478 A1 | 11/2011 | Das et al. |
| 2012/0129461 A1 | 5/2012 | Venkatraman |
| 2012/0269170 A1 | 10/2012 | Chen et al. |
| 2013/0072227 A1 | 3/2013 | Morgan et al. |
| 2013/0072228 A1 | 3/2013 | Naguib et al. |
| 2013/0121173 A1 | 5/2013 | Chen et al. |
| 2013/0143497 A1 | 6/2013 | Das et al. |
| 2013/0170374 A1 | 7/2013 | Aljadeff |
| 2013/0223261 A1 | 8/2013 | Aggarwal et al. |
| 2013/0237246 A1 | 9/2013 | Aggarwal et al. |
| 2013/0286959 A1 | 10/2013 | Lou et al. |
| 2014/0018065 A1 | 1/2014 | Naguib et al. |
| 2014/0269400 A1 | 9/2014 | Aldana et al. |
| 2015/0031402 A1 | 1/2015 | Sridhara et al. |

FOREIGN PATENT DOCUMENTS

| | | |
|---|---|---|
| CN | 1509561 A | 6/2004 |
| CN | 1575017 A | 2/2005 |
| CN | 1747605 A | 3/2006 |
| CN | 1783810 A | 6/2006 |
| CN | 1914939 A | 2/2007 |
| CN | 101000369 A | 7/2007 |
| CN | 101023632 A | 8/2007 |
| CN | 101082665 A | 12/2007 |
| CN | 101455001 A | 6/2009 |
| EP | 1050977 A2 | 11/2000 |
| EP | 1180696 A2 | 2/2002 |
| EP | 1253404 A2 | 10/2002 |
| EP | 1253437 A2 | 10/2002 |
| EP | 1398913 A2 | 3/2004 |
| EP | 1480483 A2 | 11/2004 |
| EP | 1641183 | 3/2006 |
| EP | 1691170 | 8/2006 |
| EP | 1808708 A2 | 7/2007 |
| EP | 1862811 A2 | 12/2007 |
| EP | 1879370 A1 | 1/2008 |
| EP | 1992964 A2 | 11/2008 |
| EP | 2073562 A1 | 6/2009 |
| JP | 50052993 A | 5/1975 |
| JP | 59046568 A | 3/1984 |
| JP | 8146110 A | 6/1996 |
| JP | 8211141 A | 8/1996 |
| JP | 11313359 A | 11/1999 |
| JP | 11326484 A | 11/1999 |
| JP | 2000244967 A | 9/2000 |
| JP | 2001007764 A | 1/2001 |
| JP | 2001147262 A | 5/2001 |

(56) References Cited

FOREIGN PATENT DOCUMENTS

| | | |
|---|---|---|
| JP | 2001268622 A | 9/2001 |
| JP | 2001359146 A | 12/2001 |
| JP | 2002040121 A | 2/2002 |
| JP | 2002051000 A | 2/2002 |
| JP | 2002098747 A | 4/2002 |
| JP | 2002159041 A | 5/2002 |
| JP | 2003510614 A | 3/2003 |
| JP | 2003174665 A | 6/2003 |
| JP | 2003204572 A | 7/2003 |
| JP | 2003279648 A | 10/2003 |
| JP | 2004258009 A | 9/2004 |
| JP | 2004350088 A | 12/2004 |
| JP | 2005140617 A | 6/2005 |
| JP | 2005520139 A | 7/2005 |
| JP | 2005345200 A | 12/2005 |
| JP | 2006013894 A | 1/2006 |
| JP | 2006507500 A | 3/2006 |
| JP | 2006145223 | 6/2006 |
| JP | 2006148457 A | 6/2006 |
| JP | 2006170891 A | 6/2006 |
| JP | 2006311475 A | 11/2006 |
| JP | 2006352810 A | 12/2006 |
| JP | 2007500491 A | 1/2007 |
| JP | 2007089006 A | 4/2007 |
| JP | 2007127584 A | 5/2007 |
| JP | 2007212420 A | 8/2007 |
| JP | 2007248362 A | 9/2007 |
| JP | 2007526445 A | 9/2007 |
| JP | 2007529943 A | 10/2007 |
| JP | 2008026138 A | 2/2008 |
| JP | 2008029003 A | 2/2008 |
| JP | 2008039738 A | 2/2008 |
| JP | 2008054351 A | 3/2008 |
| JP | 2008507866 A | 3/2008 |
| JP | 2008104029 A | 5/2008 |
| JP | 2008122132 A | 5/2008 |
| JP | 2008128728 A | 6/2008 |
| JP | 2008522181 A | 6/2008 |
| JP | 2008527769 A | 7/2008 |
| JP | 2008533436 A | 8/2008 |
| JP | 2008224657 A | 9/2008 |
| JP | 2008233066 A | 10/2008 |
| JP | 2008236516 A | 10/2008 |
| JP | 2009074974 A | 4/2009 |
| JP | 2009150872 A | 7/2009 |
| JP | 2009253494 A | 10/2009 |
| JP | 2010019597 A | 1/2010 |
| JP | 2013167630 A | 8/2013 |
| TW | I240085 B | 9/2005 |
| TW | I250303 B | 3/2006 |
| TW | 200618539 | 6/2006 |
| TW | 200718972 | 5/2007 |
| TW | I292829 B | 1/2008 |
| TW | 200816840 A | 4/2008 |
| TW | I300852 B | 9/2008 |
| WO | WO9913662 | 3/1999 |
| WO | 0120260 A1 | 3/2001 |
| WO | 0123904 A2 | 4/2001 |
| WO | WO-02063327 A2 | 8/2002 |
| WO | WO03038466 | 5/2003 |
| WO | 2007021292 A2 | 2/2007 |
| WO | WO2007056738 | 5/2007 |
| WO | 2008012188 A1 | 1/2008 |
| WO | 2008057737 A2 | 5/2008 |
| WO | WO-2008051124 A1 | 5/2008 |
| WO | WO2008066927 | 6/2008 |
| WO | WO-2008085440 A2 | 7/2008 |
| WO | 2008121878 A1 | 10/2008 |
| WO | 2008140880 A1 | 11/2008 |
| WO | WO2010059934 | 5/2010 |
| WO | WO-2014137545 | 9/2014 |

OTHER PUBLICATIONS

IEEE Transactions on Mobile Computing; Sensor Measurements for Wi-Fi Location with Emphasis on Time-of-Arrival Ranging; Golden, Stuart A. and Bateman, Steve S.; vol. 6, No. 10, Oct. 2007.
Awad, A., et al., "Adaptive Distance Estimation and Localization in WSN Using RSSI Measures" 10th EUROMICRO Conference on Gidital System Design Architectures, Methods, and Tools (DSD 2007) Los Alamitos, CA IEEE Computer Soc., Piscataway, NJ, US Aug. 29, 2007 pp. 471-478.
Israel Martin-Escalona, et al., "Impact of geometry on the accuracy of the passive-TDOA algorithm" Personal, Indoor and Mobile Radio Communications, 2008. PIMRC 2008. IEEE 19th International Symposium on, IEEE, Piscataway, NO, USA, Sep. 15, 2008, pp. 1-6, XP031371602 ISBN: 978-1-4244-2643-0 abstract I I . Passive-TDOA Positioning Algorithm.
Jan Blumenthal, et al., "Precise Positioning with a Low Complexity Algorithm in Ad hoc Wireless Sensor Networks" Pik. Praxis Der InformationsVerarbeitung.
Und Kommunikation, Saur, Muenchen, DE LNKD—DOI:10.1515/PIK0.2005.80, [Online] vol. 28, No. 2, Jun. 1, 2005, pp. 80-85, XP002495976.
Mao, et al., "Wireless sensor network localization techniques" Computer Networks, Elsevier Science Publishers B.V;, Amsterdam, NL LNKD—DOI: 10.1016/J.COMNET. 2006.11.018, vol. 51, No. 10, May 6, 2007, pp. 2529-2553, XP022063022 ISSN: 1389-1286.
McCrady, et al. "Mobile Ranging with Low Accuracy Clocks", Radio and Wireless Conference 1999, pp. 85-88.
Murad Abusubaih, et al., "A dual distance measurement scheme for indoor IEEE 802.11 wireless local area networks" Mobile Wireless Communications Networks, 2007 9th IFIP International Conference on, IEEE, Piscataway, NJ, USA, Sep. 19, 2007, pp. 121-125, XP031359266 ISBN: 978-1-4244-1719-3.
Written Opinion—PCT/US2009/065129—International Search Authority European Patent Office—Mar. 31, 2010.
Xinrong Li, et al., "Comparison of indoor geolocation methods in DSSS and OFDM wireless LAN systems" Vehicular Technology Conference, 2000. IEEE VTS Fall VTC 2000. 52nd Sep. 24-28, 2000, Piscataway, NJ, USA,IEEE, vol. 6, Sep. 24, 2000, pp. 3015-3020, XP010525129 ISBN: 978-0-7803-6507-0 abstract p. 3017, right-hand column.
Andre Gunther, et al., "Measuring Round Trip Times to Determine the Distance between WLAN Nodes", Proceedings of Networking 2005, May 6, 2005, pp. 1-12, XP002655207, Waterloo, Canada pp. 1-6.
Gerasenko S., et al., "Beacon Signals: What, Why, How, and Where", IEEE Computer Society, Computer, vol. 34, No. 10, pp. 108-110, Oct. 2001, doi:10.1109/2.955103.
Lim Y., et al., "Wireless Intrusion Detection and Response", IEEE, 8 Pages, 2003.
Watkins L., et al., "A Passive Approach to Rogue Access Point Detections", IEEE, 6 pages, 2007.
Manolakis D.E., "Efficient Solution and Performance analysis of 3-D Position Estimatin by Trilateration", IEEE Transactions on Aerospace and Electronic Systems, vol. 32, No. 4, Oct. 1996.
Taiwan Search Report—TW098139596—TIPO—Jan. 23, 2013.
International Search Report and Written Opinion—PCT/US2014/026295—ISA/EPO—Oct. 28, 2014.

* cited by examiner

METHOD AND APPARATUS FOR TWO-WAY RANGING

CLAIM OF PRIORITY UNDER 35 U.S.C. §119

The present Application for Patent claims priority to U.S. Provisional Application Ser. No. 61/117,859, entitled "MEASURING PROCESSING DELAY FOR TWO-WAY RANGING," filed Nov. 25, 2008, assigned to the assignee hereof and hereby expressly incorporated by reference herein.

BACKGROUND

1. Field

The subject matter disclosed herein relates to measurement of processing delay.

2. Information

Some mobile wireless devices estimate their current positions or locations by contacting nearby wireless devices, such as access points at stationary or substantially fixed positions or locations, or other mobile wireless devices. An access point, for example, may be stationary and at a known position. A mobile wireless device may estimate its distance from an access point by transmitting a packet to such an access point. Upon receipt of the packet, an access point may transmit an acknowledgement packet back to the mobile wireless device. Such a mobile wireless device may subsequently estimate its distance based on a measured round-trip delay from when a packet was sent to an access point and until an acknowledgement packet was received.

In order to precisely measure distance, a measurement of the round-trip time has to be accurate. However, an access point does not typically instantly transmit an acknowledgement packet upon receipt of a packet. Instead, an access point may perform some additional operations upon receipt of a packet and prior to sending an acknowledgement packet. Accordingly, there may be some processing delay by the access point prior to sending the acknowledgement packet.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
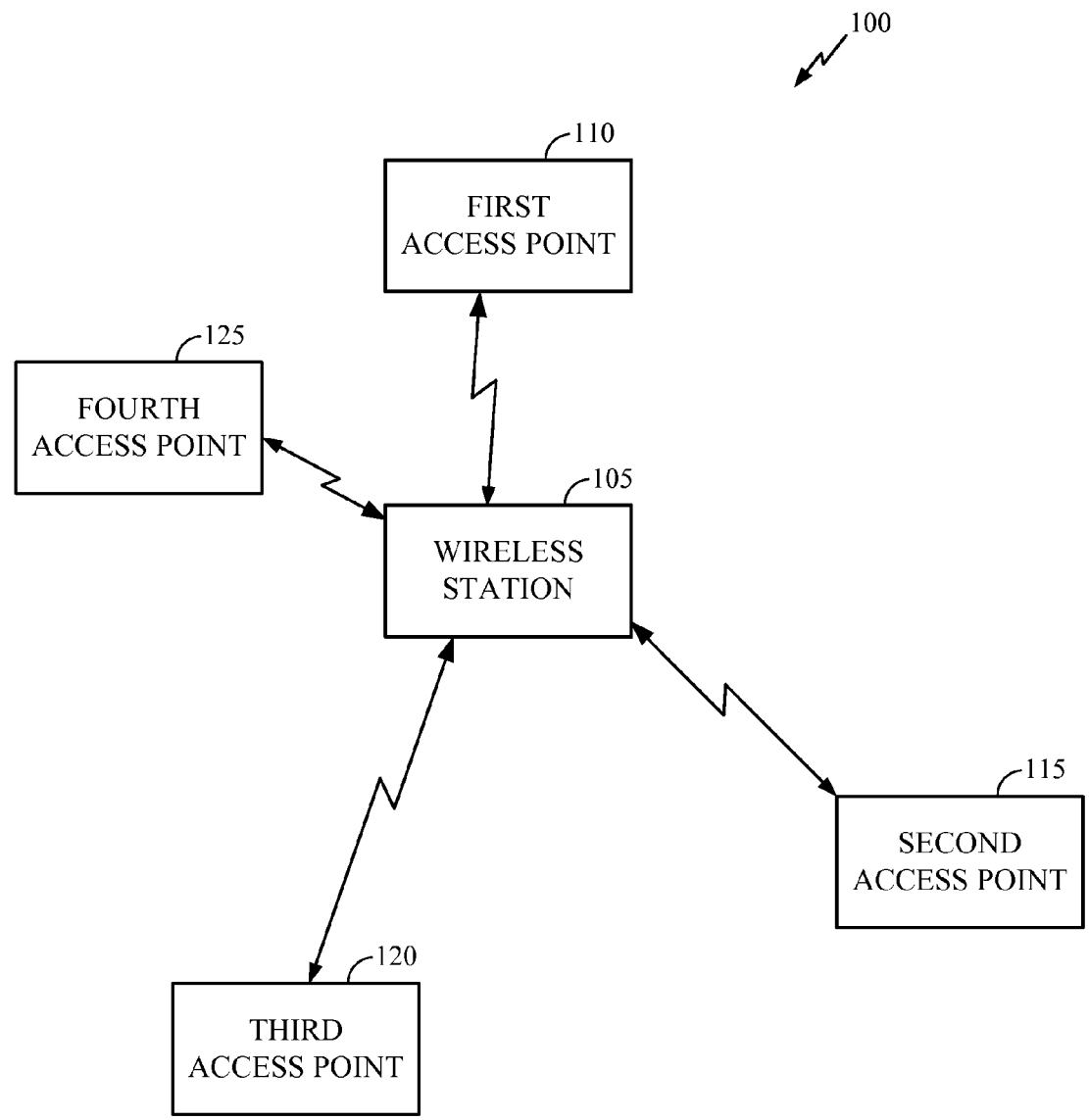
FIG. 1 illustrates a system for determining a position of a wireless station according to one implementation.

In one particular implementation, a method is provided in which a first communication is received wirelessly by a wireless device. A processing delay may be measured, by the wireless device, prior to generating an acknowledgement communication indicating receipt of the first communication. A measurement of the processing delay may be broadcast in a broadcast packet, or by transmitting a subsequent communication including the processing delay in response to receiving a second communication having a request for the measurement of the processing delay. It should be appreciated, however, that this is merely an example implementation and that other implementations may be employed without deviating from claimed subject matter.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

A wireless or mobile station may periodically contact nearby wireless devices to estimate its current position. A wireless or mobile device may contact nearby wireless devices or one or more cellular base stations. In one particular example, if nearby wireless devices are associated with known positions, a wireless station may estimate its position by determining distances between itself and several nearby wireless devices. For example, such nearby wireless devices may comprise one or more access points or femtocells or other wireless stations for which a position may be known.

In order to estimate its position, a wireless station may transmit a communication, such as a packet, to an access point (or femtocell), for example. Upon receiving such a packet, an access point may transmit an acknowledgement packet to indicate that such a packet was received. After receiving an acknowledgement packet, for example, a wireless station may determine a round-trip time difference between when a packet was transmitted and when an acknowledgement packet was received. A wireless signal may be transmitted at a known speed, such as at the speed of light, which is 299,792,458 meters/second. Because a propagation speed at which a wireless signal is transmitted is known, a distance may be estimated based on a measured amount of round-trip time elapsed for wireless signals to be transmitted/received between a wireless device and a wireless station, such as an access point or femtocell. However, there may be a processing delay at a wireless station (e.g., access point or femtocell) between a time at which a packet is received at the wireless station and a time at which an acknowledgment is transmitted in response. By accurately determining such a processing delay, distances may be accurately estimated. Approximately 1.0 foot of error may be introduced, for example, for every nanosecond of error in a measurement of a round-trip processing delay in one particular implementation.

"Processing delay," as used herein, may refer to a delay between receipt of a signal and a transmission of a response. In one implementation, a processing delay may comprise a time interval between when a packet is received by an access point or femtocell or other wireless device and a time at which a packet or other communication, such as an acknowledgement packet, is sent by the access point or femtocell or other wireless device. Such a processing delay may be caused by execution of one or more processes or functions by such an access point. However, this is merely an example of a source of processing delay and claimed subject matter is not limited in this respect.

A method, system, and apparatus, as discussed herein may be utilized to measure processing delays incurred by an access point or femtocell or other wireless device in response to receiving a packet, e.g., a packet containing a ranging request. Such processing delays may be transmitted to wireless devices in a subsequent transmission e.g., in response to subsequent requests for such processing delays or may be periodically broadcast to a range of wireless devices. Such a method, system, and apparatus may be adapted to measure processing delays with a high degree of precision.

A wireless device may measure a time difference between when a packet containing a ranging request is transmitted and when an acknowledgment packet is received. A processing delay may be subtracted from such a time difference, and the resultant time differential may be utilized to estimate a distance between a wireless device and an access point, for example.

To accurately measure a round-trip time between transmission of a packet by a wireless device and receipt of an acknowledgement packet, a measurement of processing delay at an access point may be subtracted from a time difference observed by the wireless device. A wireless signal may travel at about the speed of light, which is a known constant speed. In a vacuum, the speed of light has been observed to travel at 299,792,458 meters/second. A round-trip time for communications may be utilized to estimate a distance between a wireless device and an access point.

In one implementation, a processing delay for a particular access point may be estimated a priori and transmitted to a wireless device in an acknowledgement packet. Alternatively, processing delays for various access points may be determined a priori and stored in a lookup table stored within or accessible to a wireless device. A distance may then be estimated by subtracting such a measurement of processing delay from a measured round-trip time between sending a packet and receiving an acknowledgement packet. A drawback of such an implementation, however, is that the implicit assumption that processing delays for an access point are constant over time. In the event, however, that an access point is performing multiple functions at a time, processing delays may be increased. Accordingly, using a constant measurement of processing delay may result in inaccurate distance measurements.

In another implementation, an access point may determine its own processing delay and transmit a measurement of such processing delay in an acknowledgement packet sent to a wireless device. For example, an access point may determine its own processing delay, e.g., a time difference between when a packet is received and when a packet is ready to be transmitted from the access point. Prior to transmission, a measurement of such processing delay may be inserted as a field, for example, in an acknowledgment packet sent to a wireless device. A measurement of processing delay may comprise a number representing a time length of such processing delay. However, such an implementation may not fully account for the entire processing delay associated with an access point. For example, inserting a measurement of a measured processing delay into a frame of an acknowledgement packet takes time and may result in an additional processing delay that may not be measured. Such additional processing delay may be incurred while inserting such a measured processing delay up until the point that a packet is ready to be transmitted. Accordingly, a measurement of a processing delay that is inserted into an acknowledgement packet, for example, may not accurately represent a full processing delay and may therefore result in an erroneous estimate of a distance between a wireless device and an access point.

According to one particular implementation, a packet may be transmitted from a wireless device to an access point (or femtocell), and such an access point may acknowledge receipt by transmitting an acknowledgement packet to such a wireless device. An access point may measure its processing delay between the time at which it receives a packet and a time at which it transmits its acknowledgement packet. Such a measurement of processing delay may be transmitted in a subsequent packet or in a beacon broadcast by such an access point. In the event that a broadcast packet is transmitted, such a broadcast packet may be transmitted to multiple recipients within a coverage area. A broadcast packet therefore differs from a unicast packet which may, for example, be intended for a single recipient.

In one implementation, a wireless device may transmit a subsequent packet requesting a processing delay incurred by an access point (or femtocell). In another implementation, such a processing delay may be automatically transmitted in a subsequent packet. For example, in an implementation in which several data packets are exchanged between an access point (or femtocell) and a wireless device, such a measurement of processing delay may be appended to one of such data packets.

In one implementation, an access point (or femtocell) may communicate with several wireless devices during a particular time period. Such an access point may measure processing delays incurred prior to sending acknowledgement packets in response to receiving packets from each wireless device. In a particular implementation, a wireless device may be associated with a unique identifier (ID), such as a Media Access Control (MAC) ID. An access point may include a memory for storing measurements of processing delays associated with processing of particular packets received from various wireless devices. Such an access point may periodically broadcast a beacon message containing measurements of processing delays associated with various packets received during a predefined time period. A broadcast packet may include one or more most recently measured processing delays.

In some implementations, an access point (or femtocell) may measure processing delays associated with every packet received from a wireless device. In other implementations, processing delays may only be measured upon receipt of certain packets. For example, in one particular implementation, an access point (or femtocell) may measure its processing delay selectively in response to receipt of a packet containing a ranging request, e.g., a specific request for an acknowledgement packet to determine a distance from the access point (or femtocell).

FIG. 1 illustrates a system 100 for determining a position of a wireless station 105 according to one implementation. In this example, four access points are illustrated—a first access point 110, a second access point 115, a third access point 120, and a fourth access point 125. Each access point may be associated with a known position, such as, for example, earth-centered X, Y, Z coordinates. Although four access points are illustrated, it should be appreciated that in some implementations, more or fewer than four access point may be utilized. Moreover, one or more wireless devices other than access points may alternatively be utilized, provided such one or more wireless devices are associated with known positions. A "position" or "location," as used herein may be represented by geographic coordinates such as latitude and longitude. The position or location as used herein can also be relative. For example in a mall, the positions may be relative to the coordinates of the mall.

Wireless station 105 may be mobile and as a user carrying wireless station 105 physically moves, it may be desired to estimate a current position of wireless station 105 at a particular point in time. Such position may be estimated by measuring distances between wireless station 105 and other devices having known locations, such as access points shown in FIG. 1 (or femtocells, for example). Wireless station 105 may determine its distance from first access point 110 by, for example, transmitting a packet to first access point 110. Such a packet may include a ranging request. Wireless station 105 may include an internal clock or other timing device and may precisely determine a time at which such a packet is transmitted, which in this case may be denoted at $T_1$. Upon receiving such a packet, first access point may transmit an acknowledgement packet to wireless station to acknowledge the receipt of that packet. First access point 110 (or femtocell) may incur some processing delay between the time at which a packet is received and the time at which an acknowledgement packet is transmitted, as discussed above.

First access point 110 (or femtocell) may determine its processing delay, denoted as $T_{delay}$, and transmit such processing delay to wireless station 105 after an acknowledgement packet has been transmitted. In one implementation, for example, wireless station 105 may transmit a subsequent packet containing a request for a measurement of a processing delay for a previous packet having a ranging request. In response to receiving such a packet, first access point 110 may transmit such a measurement of processing delay in a subsequent packet transmitted to wireless station 105. In another implementation, there may be an ongoing exchange of data in several data packets between first access point 110 and wireless station 105. First access point 110 may, for example, append such a processing delay to one of such data packets.

In one particular implementation, first access point 110 (or femtocell) may be in communication with several wireless stations and may periodically transmit all, or some, measurements of processing delays in a broadcast message, such as a beacon. A wireless device need not respond to such a broadcast message. First access point 110 may communicate with several wireless devices and may measure processing delays upon receiving packets or other communications from such wireless devices. A processing delay may be a measurement or number corresponding to that particular access point (or femtocell). Such a measurement may change based on the load at the access point (or femtocell), but should not change based on a wireless device it is communicating with.

In one implementation, first access point 110 (or femtocell) may be adapted to return the latest delay measurement for a particular wireless device requesting ranging.

In one particular implementation, first access point 110 (or femtocell) may transmit a broadcast message containing identifiers associating each measured processing delay with each wireless device. For example, first access point 110 may transmit a measured processing delay and a timestamp indicating when each processing delay was measured. This may be useful when wireless station 105 can store the transmission time of the ranging request, receipt time of the acknowledgement packet, and use this processing delay to estimate the roundtrip time. Such a process may mitigate a problem of varying processing delay due to a varying load at first access point 110 or other impairments.

Referring back to FIG. 1, upon receiving an acknowledgement packet from first access point 110 (or femtocell), wireless station 105 may determine a time at which such acknowledgement packet was received. Such a time may be denoted as $T_2$. Wireless station 105 may subsequently determine a time difference between transmission of a packet sent to first access point 110 and receipt of an acknowledgement packet from first access point 110, e.g., $T_2-T_1$. Next, upon receiving a measured processing delay $T_{delay}$ from first access point 110, wireless station 105 may subtract such processing delay from a measured time difference. Once the resulting time difference, $T_{result}$, after accounting for processing delay is determined, a distance between wireless station 105 and first access point 110 may be estimated. Wireless signals transmitted between first access point 110 and wireless station 105 may travel at the speed of light, a known constant of c, e.g., 299,792,458 meters/second in a vacuum.

In this example, a distance may be calculated to be $c*(½)*T_{result}$. The resulting time difference, $T_{result}$, is divided by a factor of two in this equation because the total time between when a packet is transmitted and an acknowledgement packet is received covers the distance between wireless station 105 and first access point 110 twice—i.e., a packet transmitted by wireless station 105 travels the full distance between wireless station 105 and first access point 110, and an acknowledgement packet travels the full distance between first access point 110 and wireless station 105.

Distances may also be calculated in a similar manner between wireless station 105 and each of second access point 115, third access point 120, and fourth access point 125. After each of such distances has been measured, wireless station 105 may utilize such distances and known positions of such access points to triangulate its position.

Wireless station 105 and/or one or more of first-fourth access points 110, 115, 120, and 125 (and/or one or more femtocells, for example), may provide functionality, for example, through the use of various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Communications (GSM), Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. The techniques may be implemented for use with a Ultra Mobile Broadband (UMB) network, a High Rate Packet Data (HRPD) network, a CDMA2000 1X network, GSM, Long-Term Evolution (LTE), and/or the like.

Figure 2:
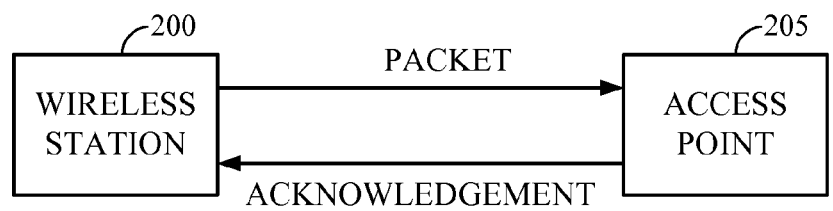
FIG. 2 illustrates a packet flow diagram between a wireless station and an access point according to one implementation.

FIG. 2 illustrates a packet flow diagram between a wireless station 200 and an access point 205 (or femtocell, for example) according to one implementation. First, a packet may be transmitted from wireless station 200 to access point 205, and then an acknowledgement packet may be transmitted from access point 205 to wireless station 200. As discussed above with respect to FIG. 1, access point 205 may subsequently transmit a measurement of a processing delay to wireless station 200. For example, wireless station 200 may transmit a later request in a subsequent packet requesting a processing delay and access point 205 may transmit such processing delay in a later packet. Alternatively, access point 205 may transmit processing delays associated with several wireless stations in a later broadcast message.

Figure 3:
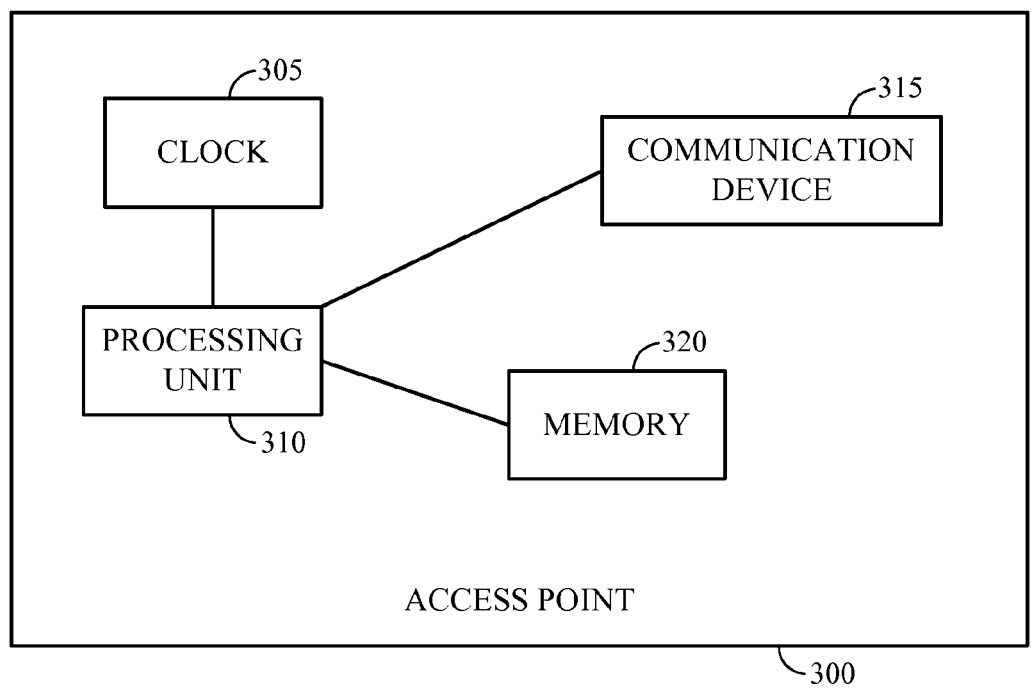
FIG. 3 is a block diagram illustrating components of an access point according to one implementation.

FIG. 3 is a block diagram illustrating components of an access point 300 (or femtocell, for example) according to one implementation. As shown, access point 300 may include a clock 305, processing unit 310, communication device 315, and memory 320. Communication device 315 may transmit and receive packets and may otherwise communicate with a wireless network. Upon receiving a packet, processing unit 310 may determine a "receive" time via reference to clock 305. Processing unit 310 may store such a "receive" time in memory 320. Processing unit 310 may then cause communication device 315 to transmit an acknowledgement packet. Upon transmitting such an acknowledgment packet, a "transmit" time may be determined via reference to clock 305 and may be stored in memory 320. Processing unit 310 may determine/measure processing delay by determining a time interval between a "transmit" time and a "receive" time, for example, by subtracting a "transmit" time from a "receive" time, and may transmit such measurement of the processing delay to a wireless device. Processing unit 310 may also determine/measure the processing delay by determining/measuring the most recent time interval from "receive" to "transmit," for example, by keeping count of the passage of time between "receive" and "transmit." Processing unit 310 may generate a timestamp at which the processing delay is measured, for example, by utilizing clock 305. The timestamp may be used to distinguish between multiple measurements of processing delays or to determine the most recently measured processing delays, for example.

Figure 4:
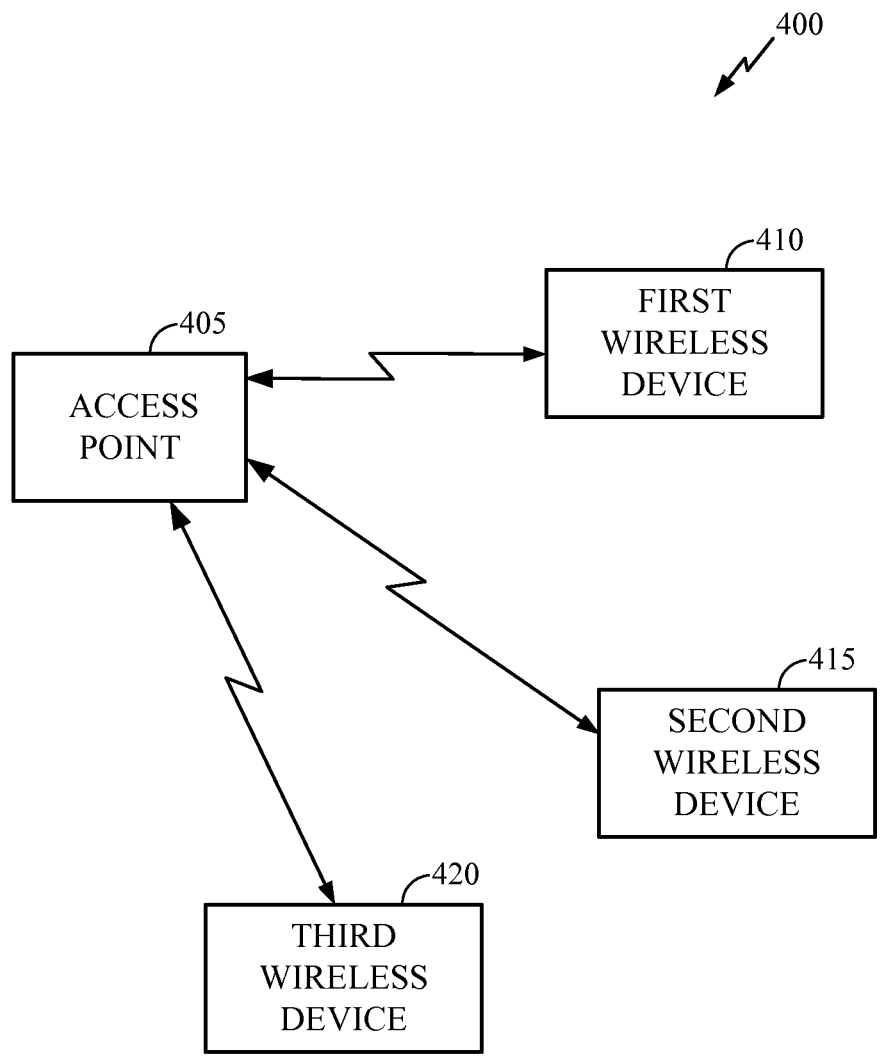
FIG. 4 illustrates a system for determining a position of several wireless stations according to one implementation.

FIG. 4 illustrates a system 400 for determining position of several wireless devices according to one implementation. In this example, an access point 405 (or femtocell, for example) is in communication with a first wireless device 410, a second wireless device 415, and a third wireless device 420. Each wireless device may transmit packets containing ranging requests to access point 405, and processing delays may be determined for each of such requests. Access point 405 may store several observed processing delays and periodically broadcast a message containing such observed processing delays. In one implementation, each wireless device may be associated with a unique ID and a broadcast message may indicate processing delays associated with communication with each wireless device using each particular unique ID.

Figure 5:
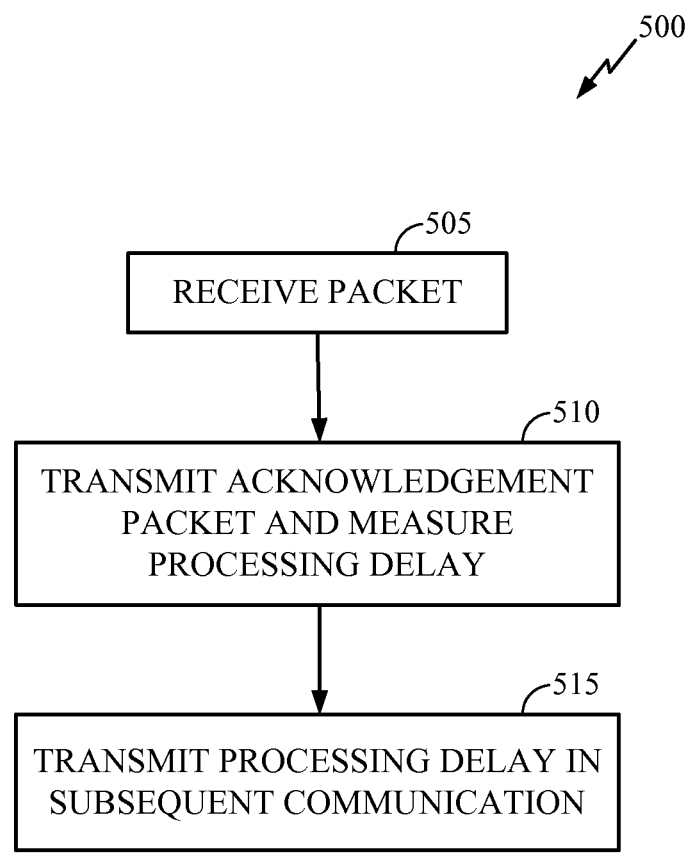
FIG. 5 illustrates a method for calculating and transmitting a processing delay according to one implementation.

FIG. 5 illustrates a method 500 for calculating and transmitting a processing delay according to one implementation. First, at operation 505, a packet is received by an access point (or femtocell, for example) from a wireless device, for example. Next, at operation 510, an acknowledgement packet is transmitted by such an access point and a processing delay is measured. Finally, at operation 515, a measured processing delay is transmitted to a wireless device in a subsequent communication. In one example, as discussed above, a wireless device may transmit a second packet requesting a processing delay from a first packet received in operation 505, and such a processing delay may be transmitted in a later packet. Alternatively, for example, access point (or femtocell, for example) may store several observed processing delays and transmit such processing delays in a later broadcast message.

Figure 6:
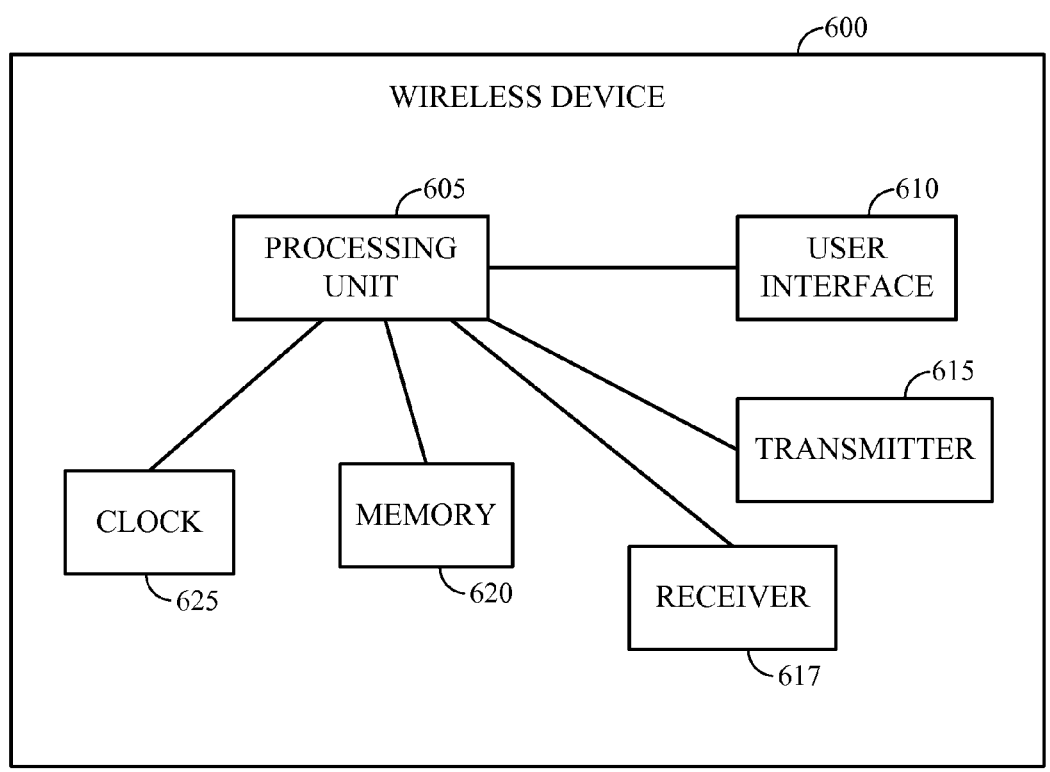
FIG. 6 shows a particular implementation of a wireless device according to one implementation.

FIG. 6 shows a wireless device 600 according to one implementation. Wireless device 600 may comprise a mobile station (MS) in which a radio transceiver may be adapted to modulate an RF carrier signal with baseband information, such as voice or data, onto an RF carrier, and demodulate a modulated RF carrier to obtain such baseband information.

Wireless device 600 may include several elements such as processing unit 605, user interface 610, transmitter 615, receiver 617, memory 620, and clock 625. User interface 610 may comprise a plurality of devices for inputting or outputting user information such as voice or data. Such devices may include, for example, a keypad, a display screen, a microphone, and a speaker.

Memory 620 may be adapted to store machine-readable instructions, which are executable to perform one or more of processes, implementations, or examples thereof which have been described or suggested. Processing unit 605 may be adapted to access and execute such machine-readable instructions. Through execution of these machine-readable instructions, processing unit 605 may be adapted to perform one or more functions or operations (e.g., by directing various elements of wireless device 600 to perform one or more functions or operations).

Transmitter 615 may utilize an antenna to transmit communications, such as packet-based communications to other wireless devices. Receiver 617 may also utilize such an antenna to receive communications, such as packet-based communications from other wireless devices. For example, receiver 617 may receive a processing delay $T_{delay}$ from an access point or femtocell. Processing unit 605 may store $T_{delay}$ in memory 620. Processing unit 605 may utilize clock 625 to measure time intervals, for example, between when a packet is transmitted (e.g., $T_1$) and when an acknowledgement packet is received (e.g., $T_2$), and store $T_1$ and $T_2$ in memory 620. Processing unit 605 may calculate the distance between wireless device 600 and the access point or femtocell using $T_1$, $T_2$ and $T_{delay}$, as discussed.

Some portions of the detailed description herein are presented in terms of algorithms or symbolic representations of operations on binary digital signals stored within a memory of a specific apparatus or special purpose computing device or platform. In the context of this particular specification, the term specific apparatus, special purpose apparatus, special purpose computing device, or the like includes, for example, a general purpose computer once it is programmed to perform particular functions or operations pursuant to instructions from program software. Algorithmic descriptions or symbolic representations are examples of techniques used by those of ordinary skill in the signal processing or related arts to convey the substance of their work to others skilled in the art. An algorithm as here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. For example, a specific computing apparatus may comprise one or more processing units programmed with instructions to perform one or more specific functions.

Position determination techniques described herein may be used in combination with or in place of other position determination techniques, such as SPS-based techniques. A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). The techniques are not restricted to global systems (e.g., GNSS) for SPS. For example, the techniques may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, an SPS may include any combination of one or more global and/or regional navigation satellite systems and/or augmentation systems, and SPS signals may include SPS, SPS-like, and/or other signals associated with such one or more SPS.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or software implementation, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of a mobile station and/or an access point (or femtocell) and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is implemented.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk/disc includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for measuring processing delay in a wireless access point, comprising:
   wirelessly receiving a first communication from a first mobile device, the first communication being indicative of a ranging request;
   wirelessly transmitting an acknowledgement communication indicating receipt of the first communication responsive to receiving the first communication;
   measuring a processing delay between receiving the first communication from the first mobile device and transmitting the acknowledgement communication indicating receipt of the first communication responsive to transmitting the acknowledgment communication; and
   transmitting a measurement of the processing delay separately from the acknowledgement communication in a broadcast packet, wherein the measurement of the processing delay is included with a packet to be transmitted to the first mobile device, the packet being unrelated to the first communication or the acknowledgement communication.

2. The method of claim 1, wherein the measurement of the processing delay comprises a measured time interval and a timestamp at which the processing delay was measured.

3. The method of claim 1, wherein at least one of the first communication and the acknowledgement communication comprises a packet-based communication.

4. The method of claim 1, wherein the broadcast packet comprises measurements of additional processing delays corresponding to processing associated with communications received from other mobile devices.

5. The method of claim 4, wherein the broadcast packet includes identifiers to identify which measurements of processing delays are associated with specific mobile devices.

6. The method of claim 1, wherein the broadcast packet includes a plurality of most recently measured processing delays.

7. The method of claim 1, wherein the packet unrelated to the first communication is associated with a data exchange with the first mobile device.

8. The method of claim 1, further comprising measuring a first time difference between transmitting the first communication and receiving the acknowledgement communication, and subtracting the processing delay to determine a second time difference.

9. A wireless device, comprising:
   a communication device to wirelessly receive a first communication from a first mobile device, the first communication being indicative of a ranging request; and
   a processor to:
      wirelessly transmit, via the communication device, an acknowledgement communication indicating receipt of the first communication to the first mobile device responsive to receiving the first communication;
      measure a processing delay between receiving the first communication from the first mobile device and transmitting the acknowledgement communication indicating receipt of the first communication responsive to transmitting the acknowledgement communication; and
      transmit a measurement of the processing delay separately from the acknowledgement communication in a broadcast packet, wherein the measurement of the processing delay is included with a packet to be transmitted to the first mobile device, the packet being unrelated to the first communication or the acknowledgement communication.

10. The wireless device of claim 9, wherein the measurement of the processing delay comprises a measured time interval and a timestamp at which the processing delay was measured.

11. The wireless device of 9, wherein the first communication comprises a packet-based communication.

12. The wireless device of claim 9, wherein the wireless device further comprises a memory coupled to the processor.

13. The wireless device of claim 9, wherein the communication device transmits, in the broadcast packet, measurements of additional processing delays corresponding to processing associated with communications received from other mobile devices.

14. The wireless device of claim 13, wherein the communication device transmits, in the broadcast packet, identifiers to identify which measurements of processing delays are associated with specific mobile devices.

15. The wireless device of claim 9, wherein the communication device transmits, in the broadcast packet, a plurality of most recently measured processing delays.

16. The wireless device of claim 9, wherein the wireless device has a substantially fixed position.

17. The wireless device of claim 9, further comprising a clock coupled to the processor to indicate a time measurement.

18. The wireless device of claim 9, wherein the wireless device comprises an access point.

19. The wireless device of claim 9, wherein the wireless device comprises a femtocell.

20. An apparatus, comprising:
   means for wirelessly receiving a first communication from a first mobile device, the first communication being indicative of a ranging request;
   means for wirelessly transmitting an acknowledgement communication indicating receipt of the first communication to the first mobile device responsive to receiving the first communication;
   a processor for measuring a processing delay between receiving the first communication from the first mobile device and transmitting the acknowledgement communication indicating receipt of the first communication responsive to transmitting the acknowledgement communication; and
   means for transmitting a measurement of the processing delay separately from the acknowledgement communication in a broadcast packet, wherein the measurement of the processing delay is included with a packet to be transmitted to the first mobile device, the packet being unrelated to the first communication or the acknowledgement communication.

21. The apparatus of claim 20, wherein the measurement of the processing delay comprises a measured time interval and a timestamp at which the processing delay was measured.

22. The apparatus of claim 20, wherein at least one of the first communication and the acknowledgement communication comprises a packet-based communication.

23. The apparatus of claim 20, wherein the means for transmitting transmits, in the broadcast packet, measurements of additional processing delays corresponding to processing associated with communications received from other mobile devices.

24. The apparatus of claim 23, wherein the means for transmitting transmits, in the broadcast packet, identifiers to identify which measurements of processing delays are associated with specific mobile devices.

25. The apparatus of claim 20, wherein the means for transmitting transmits, in the broadcast packet, a plurality of most recently measured processing delays.

26. The apparatus of claim 20, further comprising time measurement means to indicate a measurement of a time interval.

27. The apparatus of claim 20, wherein the apparatus comprises an access point.

28. The apparatus of claim 20, wherein the apparatus comprises a femtocell.

29. A non-transitory computer-readable medium encoded with instructions which, when executed by a special purpose apparatus, are adapted to direct the special purpose apparatus to perform operations, the instructions comprising:
- code to receive a first communication from a first mobile device, the first communication being indicative of a ranging request;
- code to transmit, via a wireless communication device, an acknowledgement communication indicating receipt of the first communication to the first mobile device responsive to receiving the first communication;
- code to measure a processing delay between receiving the first communication from the first mobile device and transmitting the acknowledgement communication indicating receipt of the first communication responsive to the transmitting the acknowledgement communication;
- code to transmit a measurement of the processing delay separately from the acknowledgement communication in a broadcast packet, wherein the code to transmit the measurement of the processing delay comprises code to include the measurement of the processing delay with a packet to be transmitted to the first mobile device, the packet being unrelated to the first communication or the acknowledgement communication.

30. The computer-readable medium of claim 29, the instructions further comprising code to transmit at least one of the first communication and the acknowledgement communication as a packet-based communication.

31. The computer-readable medium of claim 29, the instructions further comprising code to transmit, in the broadcast packet, measurements of additional processing delays corresponding to processing associated with communications received from other mobile devices.

32. The computer-readable medium of claim 31, the instructions further comprising code to transmit, in the broadcast packet, identifiers to identify which measurements of processing delays are associated with specific mobile devices.

33. The computer-readable medium of claim 29, the instructions further comprising code to transmit, in the broadcast packet, a plurality of most recently measured processing delays.

* * * * *